US008464174B2

(12) United States Patent
Trotta et al.

(10) Patent No.: US 8,464,174 B2
(45) Date of Patent: Jun. 11, 2013

(54) USER INTERFACE FOR EXPLORING MEDIA CONTENT

(75) Inventors: Nicholas Trotta, San Francisco, CA (US); Michael Patrick Bauerly, San Francisco, CA (US); Andrew Scott Brenner, Sunnyvale, CA (US); Manabu Sakamoto, Tokyo (JP)

(73) Assignees: Sony Corporation, Tokyo (JP); Sony Network Entertainment Inc., Los Angeles, CA (US)

( * ) Notice: Subject to any disclaimer, the term of this patent is extended or adjusted under 35 U.S.C. 154(b) by 212 days.

(21) Appl. No.: 12/978,875

(22) Filed: Dec. 27, 2010

(65) Prior Publication Data
US 2012/0166986 A1 Jun. 28, 2012

(51) Int. Cl.
*G06F 3/048* (2006.01)
(52) U.S. Cl.
USPC .......................................... 715/765; 715/827
(58) Field of Classification Search
USPC ................................. 715/765, 827
See application file for complete search history.

(56) References Cited

U.S. PATENT DOCUMENTS

| | | | |
|---|---|---|---|
| 7,581,186 | B2 | 8/2009 | Dowdy et al. |
| 2002/0149629 | A1 | 10/2002 | Craycroft et al. |
| 2008/0034013 | A1 | 2/2008 | Cisler et al. |
| 2008/0201659 | A1 | 8/2008 | Shen |
| 2008/0294974 | A1* | 11/2008 | Nurmi et al. .................. 715/204 |
| 2009/0228820 | A1* | 9/2009 | Kim et al. ..................... 715/769 |

FOREIGN PATENT DOCUMENTS

| | | |
|---|---|---|
| GB | 2342476 A | 4/2000 |
| WO | WO-2007138473 A2 | 12/2007 |

OTHER PUBLICATIONS

Apple, What's new in Safari 4, no date, http://www.apple.com/safari/whats-new.html#coverflow <http://www.apple.com/safari/whats-new.html>.
Taylor, Jay, Dec. 15, 2009, <http://blogs.amd.com/home/tag/htpc/page/3/>.
Haddon Ma et al.,"User Interface Technique for Selecting Multiple Interface Themes", IP.COM Journal, IP.COM Inc., West Henrietta, NY, US, Mar. 1, 1994, XP013099840, ISSN: 1533-001.

* cited by examiner

*Primary Examiner* — Andrea Leggett
(74) *Attorney, Agent, or Firm* — Haverstock & Owens LLP

(57) ABSTRACT

Methods and apparatus are provided for user interface operation. In one embodiment, a method includes displaying a user interface including one or more graphical elements, wherein display of the user interface is associated with a display configuration, and detecting a user command associated with navigating to one or more previously displayed user interface display configurations. The method may further include storing a user interface configuration for the display configuration, and adjusting display of the user interface based on the user command.

19 Claims, 6 Drawing Sheets

USER INTERFACE FOR EXPLORING MEDIA CONTENT

CROSS REFERENCE TO RELATED APPLICATION

This application is related to commonly-assigned U.S. patent application Ser. No. 12/966,131, entitled "User Interface for Prioritizing Media Content", and U.S. patent application Ser. No. 12/966,150, entitled "User Interface for Media Content Presentation", the disclosures of which are hereby fully incorporated by reference.

FIELD

The present disclosure relates generally to presentation of a user interface elements, and more particularly to methods and apparatus for navigating display configurations of a user interface.

BACKGROUND

Typical user interfaces allow for users to control a device based on a displayed menu. For example, conventional playback devices usually include one or more displayed elements (e.g., home, back, menu) that may be selected by a user to control the user interface display. In many instances, the user interface is provided by media played by a device. These user interfaces are limited by the amount of data that may be presented to a user. Generally these interfaces do not allow for a user to view or browse media associated with a plurality of titles as the user interface is generally directed to a single media. Other user interfaces allow for users to view and select media based on a network connection. For example, media titles may be viewed on a network browser application performed by a device. These methods, however, do not allow for a user to navigate to previously viewed screens of a user interface based on a stored configuration. Another drawback is the requirement of users to manually load data associated with each element of the user interface. Further, these typical methods do not allow for adjusting the display to select a particular page that was previously displayed based on one or more user selections. Thus, there is a desire for a user interface that allows for selection and presentation of graphical elements that overcomes one or more of the aforementioned drawbacks.

BRIEF SUMMARY OF THE EMBODIMENTS

Disclosed and claimed herein are methods and apparatus for user interface operation. In one embodiment, a method includes displaying, by a device, a user interface including one or more graphical elements, wherein display of the user interface is associated with a display configuration, and detecting a user command associated with navigating to one or more previously displayed user interface display configurations. The method further includes storing a user interface configuration for the display configuration, and adjusting display of the user interface based on the user command.

Other aspects, features, and techniques of the disclosure will be apparent to one skilled in the relevant art in view of the following detailed description of the disclosure.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 2A:
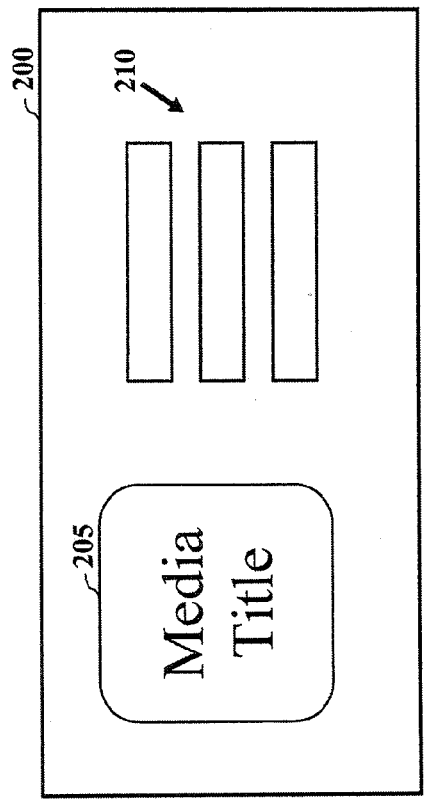
FIGS. 2A-2B depict graphical representations of a user interface according to one or more embodiments.

One aspect is directed to displaying a user interface that allows for a user to view one or more previous user interface display configurations. Many user interface applications fail to address the ability to notify an operator of the current position within the user interface and how the user arrived to the particular display configuration. One aspect of the invention is to provide a user the ability to navigate to one or more previously displayed configurations. It may be advantageous to provide a user with the ability to navigate between different display configurations of a user interface when viewing a plurality of files and/or graphical elements.

In one embodiment method and device are provided for displaying a user interface and storing display configurations based on user operation and/or navigating of the interface. Navigating to one or more display configurations may be provided based on stored display configurations by the user interface. Display configurations may relate to one or more display types of the user interface. In certain embodiments, display configurations may allow for a user to modify and/or navigate within the display configuration. For example, when the display configuration relates to a listing of graphical elements of files, the user interface may allow a user to scroll or navigate within the display configuration. When a user command is detected to display a different type of display configuration, the user interface may store the current display configuration. Stored display configuration data may relate to one or more settings and/or graphical data, such as a snapshot of the display configuration. The user interface may be configured to display, or recreate the display configuration, based on a user command.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the disclosure is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the disclosure are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

Figure 1:
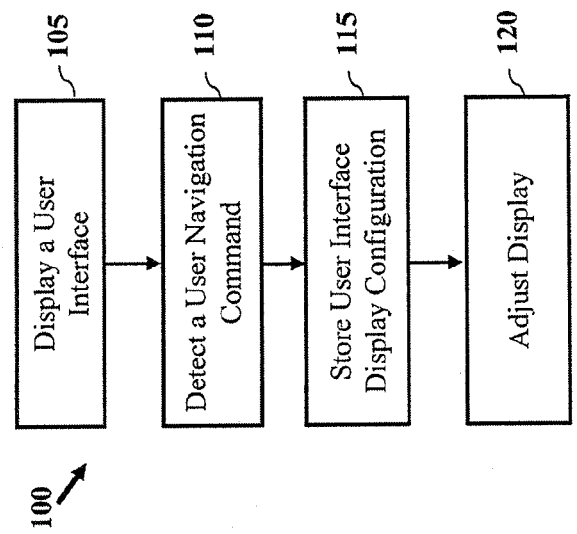
FIG. 1 depicts a process for user interface operation according to one embodiment.

One embodiment is directed to a process for user interface operation that allows a user to navigate between display configurations. Referring now to the figures, FIG. 1 depicts a process for user interface operation according to one embodiment. Process 100 may be performed by a device for operation of a user interface including user navigation of one or more stored display configurations. The user interface may be employed for one or more of media browsing, viewing network data, network applications, etc. In certain embodiments, the user interface may be employed for viewing and selecting media titles stored and/or retrieved by a device via a network connection. Process 100 may be initiated by displaying a user interface at block 105. Display of the user interface at block 105 may include one or more graphical elements. In one embodiment, the user interface may include a plurality of display configurations. By way of example, the user interface may be displayed based on operation of a user to display media titles based on a grid formation, menu based format, and/or detailed view to provide details of a media title. In certain embodiments, display of graphical elements may relate to an animation of one or more graphical elements.

Process 100 may be employed to allow a user to select one or more previously displayed and/or navigated to display configurations of the user interface. At block 110, process 100 may continue by detecting a user navigation command. In one embodiment, a user navigation command may be generated by a user selecting a button of an input device (e.g., device button of a controller, remote control, etc.). By way of example, user activation of a control button may be assigned to navigating the user interface. The control button may be assigned one or more of a back and forward commands. In certain embodiments, user activation of the button for a predetermined period of time may launch one or more of a menu and display configuration including graphical elements for one or more previously displayed configurations. The user navigation command may be detected based on a display menu according to one embodiment.

At block 115, the device may store the user interface display configuration. In one embodiment, the user interface at block 115 may store the display configuration based on user changes to the user interface displayed at block 105. In certain embodiments, display configurations of the use interface may be stored as a thread or history thread. The display configuration may include one or more settings that may be accessed by the device to return the user to previously displayed configuration.

At block 120, the display of the user interface may be adjusted based on the user navigation command. In one embodiment, when the user navigation command relates to a back or forward command, the user interface may display a previously displayed configuration. Alternatively, when the navigation command relates to display of a history thread, one or more graphical elements associated with display configurations may be displayed. Graphical elements displayed in the history thread may be based on one or more stored display configurations.

Figure 2B:
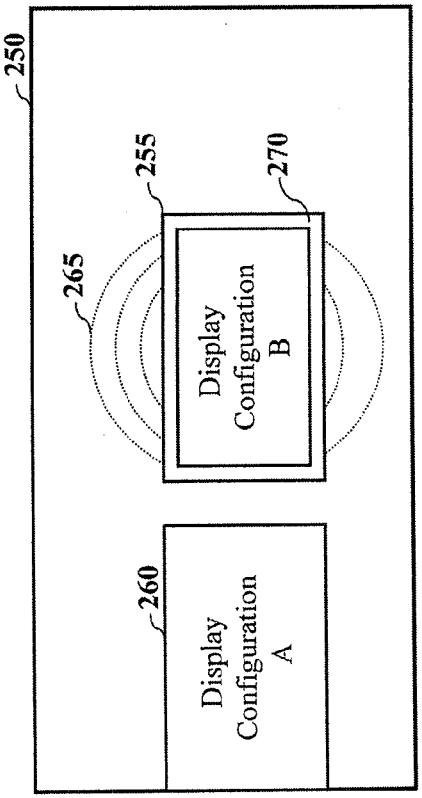

Referring now to FIGS. 2A-2B, graphical representations of a user interface are depicted according to one or more embodiments. Referring first to FIG. 2A, a graphical representation is depicted of a user interface for viewing media titles. User interface 200 includes graphical element 205 associated with a media title. Media title 205 may be displayed as a graphical element, such as cover artwork or a graphic tile. In certain embodiments, attributes associate with media title 205 may be employed to display data for a plurality of media titles. Based on the attributes of media title 205, one or more media titles may be selected. Selected media titles may further be arranged based on one or more categories.

User interface 200 may be displayed to provide one or more details associated with media title 205 and one or more pivot connections. In one embodiment, media title 205 may be displayed based on a user selection of the user interface, such as selection of the media title from a plurality of media titles. User interface 200 may provide detailed information associated with media title 205 and allow for one or more functions to be performed based on the selected media title.

Graphical display of media title 205 may relate to artwork (e.g., cover art) associated with the media title and, in some instance include text or graphics to identify the media title. User interface 200 may further display text associated with a media title shown as one of graphical elements 210, and may further include one or more graphical elements which may be selected and employed by a user to perform functions associated with media title 205.

According to one embodiment, one or more pivot connection elements may be displayed for exploring content associated with media title 205. For example, one or more media titles may be selected from a media library based on one or more pivot connections determined for media title 205. As used herein a pivot connection may relate to an association of at least one attribute of media title 205 with a similar attribute of one or more other media titles. By way of example, when media title 205 relates to a movie, an attribute of media title 205 that may be employed to determine a pivot connection includes one or more names of actors related to media title 205. Based on an actor's name, one or more media titles that include that actor may be selected. It should also be appreciated that a pivot connection may be based on a plurality of attributes.

User interface 200 may further include one or more graphical elements depicted as 210. In one embodiment, graphical elements 210 may relate to one or more selectable links that may be employed to adjust the display configuration of the user interface 200. For example, graphical elements 210 may relate to one or more selectable links for media titles associated with media title 205. Pivot connections may be associated with categories. Based on a selected pivot category, one or more media titles may be displayed.

According to one embodiment, user interface 200 may include display of one or more pivot connection elements. Each pivot connection element may include a graphical element associated with a media title based on pivot connection. Pivot connection elements may further include display of a portion of one or more additional graphical elements associated with additional media titles. Pivot connection elements may further include a text description to identify a category of the pivot connections.

Graphical elements 210 may provide pivot connection categories according to one or more embodiments. Pivot connection categories may be determined for one or more media title categories including, cast, director, awards, movie category, keyword category, date, and rating. It should also be appreciated that other categories may be employed for arranging pivot connections and selecting items for user interface 200. In one embodiment, presentation of pivot connection categories may be prioritized. According to another embodiment, a sub-set of pivot connection categories determined for a media title may be displayed on the user interface, wherein other pivot connection categories may be accessed by user scrolling of a portion of the user interface including the categories. User selection of graphical elements 210 may not require a new or different display configuration in one embodiment. One or more of graphical elements 210 may be displayed in user interface 200 to allow a user to select the media title for purchase and/or rent.

Based on a user input associated with the user interface 200, one or more previous display configurations may be displayed. For example, when the user input relates to display configuration navigating commands, such as a back command, the user interface may display the previously displayed display configuration. In another embodiment, one or more graphical elements associated with previously displayed configurations may be displayed as will be discussed in more detail below.

FIG. 2B depicts a user interface of based on a user command to navigate to one or more previously displayed configurations. User interface 250 may be displayed following display of the user interface 200. Based on a user command to navigate one or more previously displayed user interface display configurations, the user interface may display one or more graphical representation of display configurations depicted as 255 and 260. In one embodiment display configuration 255 may relate to the previously displayed, or most recent, configuration. Display configuration 260 may relate to another previously displayed configuration. Display of graphical elements 255 and 260 associated with the display configurations may be based on the order of display. By displaying graphical elements associated with a previously displayed configuration, the user interface may allow a user to navigate to a display configuration, and select a particular configuration. One advantage of providing a graphical element associated with the display configuration is that it can allow the user to select a display configuration without accessing or loading each previous display configuration. Further, the navigating between display configurations may enhance user experience.

User interface 250 may further include one or more display attributes for graphical elements to indicate highlighted or selected graphical elements. As depicted in FIG. 2B, graphical element 255 includes highlighting shown as 265 and border effect 270. Highlighting 265 may relate to a color or glow effect associated with a display element. Similarly, border effect 270 may relate to an enhanced border style to indicate highlighting and/or selection of an element.

Although user interface 200 is described above with reference to media titles, it should be appreciated that the user interface may be employed for graphical display and/or presentation of different types of elements including but not limited to account management files, personnel files, data folders, calendar entries, contacts, etc.

Figure 3:
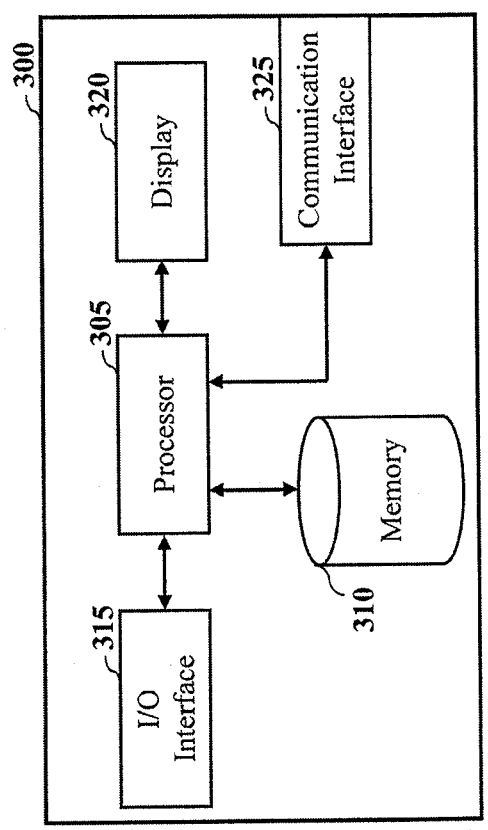
FIG. 3 depicts a simplified block diagram of a device according to one embodiment.

Referring now to FIG. 3, a simplified block diagram is depicted of a device according to one embodiment. In one embodiment, device 300 may be configured to display a user interface as described herein. In one embodiment, device 300 may relate to a display device, such as a television display for viewing media. It may also be appreciated that device 300 may relate to one or more devices configured to provide data to a display device such as, a set-top box, gaming console, media player (e.g., DVD, Blu-ray™, audio player, etc.), network based communication module, etc. In a further embodiment, device 300 may relate to a portable electronic device such as a media player, personal communication device, etc. Device 300 may be configured to employ one or more of the processes described herein for a user to explore media content.

As shown in FIG. 3, device 300 includes processor 305, memory 310, input/output (I/O) interface 315, display 320 and communication interface 325. Processor 305 may be configured to control operation of device 300 based on one or more computer executable instructions stored in memory 310. Memory 310 may relate to one of RAM and ROM memories and may be configured to store one or more media files, content, and computer executable instructions for operation of device 300.

I/O interface 315 may include one or more buttons for user input, such as a numerical keypad, volume control, channel control, menu controls, pointing device, track ball, mode selection buttons, and playback functionality (e.g., play, stop, pause, forward, reverse, slow motion, etc). Buttons of I/O interface 315 may include hard and soft buttons, wherein functionality of the soft buttons may be based on one or more applications running on device 300. I/O interface 315 may be employed for one or more user commands, such as scrolling or selection of a graphical element (e.g., graphical elements 255 and 260). I/O interface 315 may additionally be configured to decode one or more remote control commands for navigating a user interface. In another embodiment, device 300 may include one or more optical drives, not shown in FIG. 3, which may be configured to detect and decode one or more media files stored on a disc (e.g., CD, DVD™, Blu-ray™, etc.). Display 320 may be employed to display a user interface. In certain embodiments, display 320 may relate to a touch screen display configured to detect one or more user selections of the display. Although depicted with a display, it may be appreciated that display 320 may be optional in certain embodiments.

Communication interface 325 may be configured to allow for network based communications including but not limited to LAN, WAN, Wi-Fi, etc. In certain embodiments, communication interface 325 may be configured to allow for one or more devices to communicate with device 300 via wired or wireless communication. Communication interface 325 may additionally include one or more ports for receiving data, including ports for removable memory.

Figure 4A:
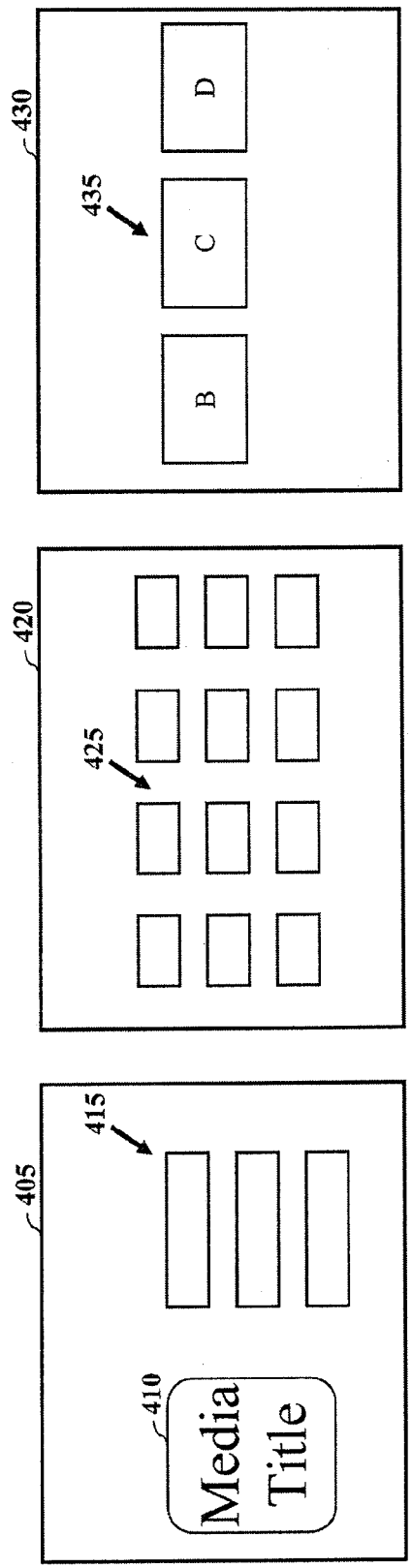
FIGS. 4A-4B depict graphical representations of user interface display configurations according to one or more embodiments.
Figure 4B:
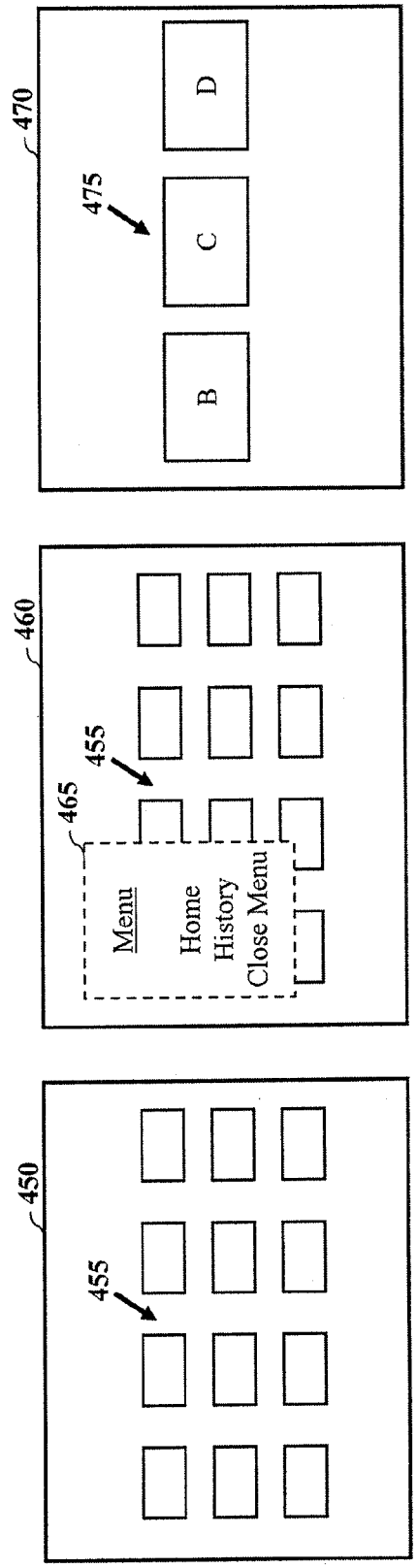

Referring now to FIGS. 4A-4B, graphical representations are depicted of user interface display configurations according to one or more embodiments. Referring first to FIG. 4A, a plurality of display configurations of a user interface are depicted according to one or more embodiments. Display configuration 405 relates to a display window of the user interface for providing one or more details of a user selected media title depicted as 410. In one embodiment, detection of a user command associated with navigating to one or more previously displayed user interface configurations may be detected during display of configuration 405. A user selection may relate to user activation of a button for control of the device. For example, the user command may relate to user activation of a navigation button (e.g., back, forward, home, etc.). The button may relate to a hard or soft key for detecting a user selection. In certain embodiments, the user interface may update the display arrangement based on the user activation of the button, and the period of user activation. Display configuration 405 may further include graphical elements 415 (e.g., graphical elements 210). As depicted in FIG. 4A, the user interface may first display a previously displayed configuration, depicted as display configuration 420 following display of display configuration 405 based on the user activation. Display of media title 410 may relate to a graphical image and/or text associated with a media file.

Display configuration 420 is depicted of the user interface including a plurality of graphical elements 425 arranged in a grid formation. In one embodiment, display configuration 420 may relate to a previous, or last, display configuration based on a navigation command. When the user activation relates to activation of a button for a particular period of time (e.g., 3 seconds), the user interface may provide display configuration 430. Display configuration 430 includes one or more graphical elements, depicted as 435, relating to previously display configurations. Graphical elements 435 (e.g., graphical elements 255 and 260) may be selected by a user to navigate to a particular display configuration.

Referring now to FIG. 4B, display configuration 450 relates to a display window of the user interface including a plurality of graphical elements 455 arranged in a grid formation. Graphical elements of display configuration 450 may relate to a subset of media titles which may be presented to a user. It should also be appreciated that additional, or fewer, media titles may be displayed in the user interface display window. In certain embodiments, the display configuration may display graphical elements in a spiral arrangement, such as a graphical display element displayed in a central position within other spirally arranged graphical display elements. The spiral arrangement may include a plurality of graphical display elements each of which having a focus state and a second group of graphical display elements with a second focus state. In one embodiment, the user interface may provide a rotating display of graphical display elements. The user interface may be presented as an animation of graphical display elements.

In one embodiment, detection of a user command associated with navigating to one or more previously displayed user interface configurations may relate to a menu displayed by the user interface. Based on the user command, a menu may be displayed for the user to select one or more navigation options. Display configuration 460 includes menu 465 displayed over graphical elements 455. Menu 465 may include one or more user selectable options for navigating the user interface, such as home screen, history thread, close menu, etc. Based on user selection of menu 465 to view a history thread, the user interface may display configuration 470 including graphical elements associated with one or more display configurations previously displayed as configuration 475 for the user.

Although FIGS. 4A and 4B have been described above as starting from a particular display configuration, it should be appreciated that a user interface may adjust a display configuration and/or display graphical elements associated with display configurations from one or more different displayed configurations.

Figure 5:
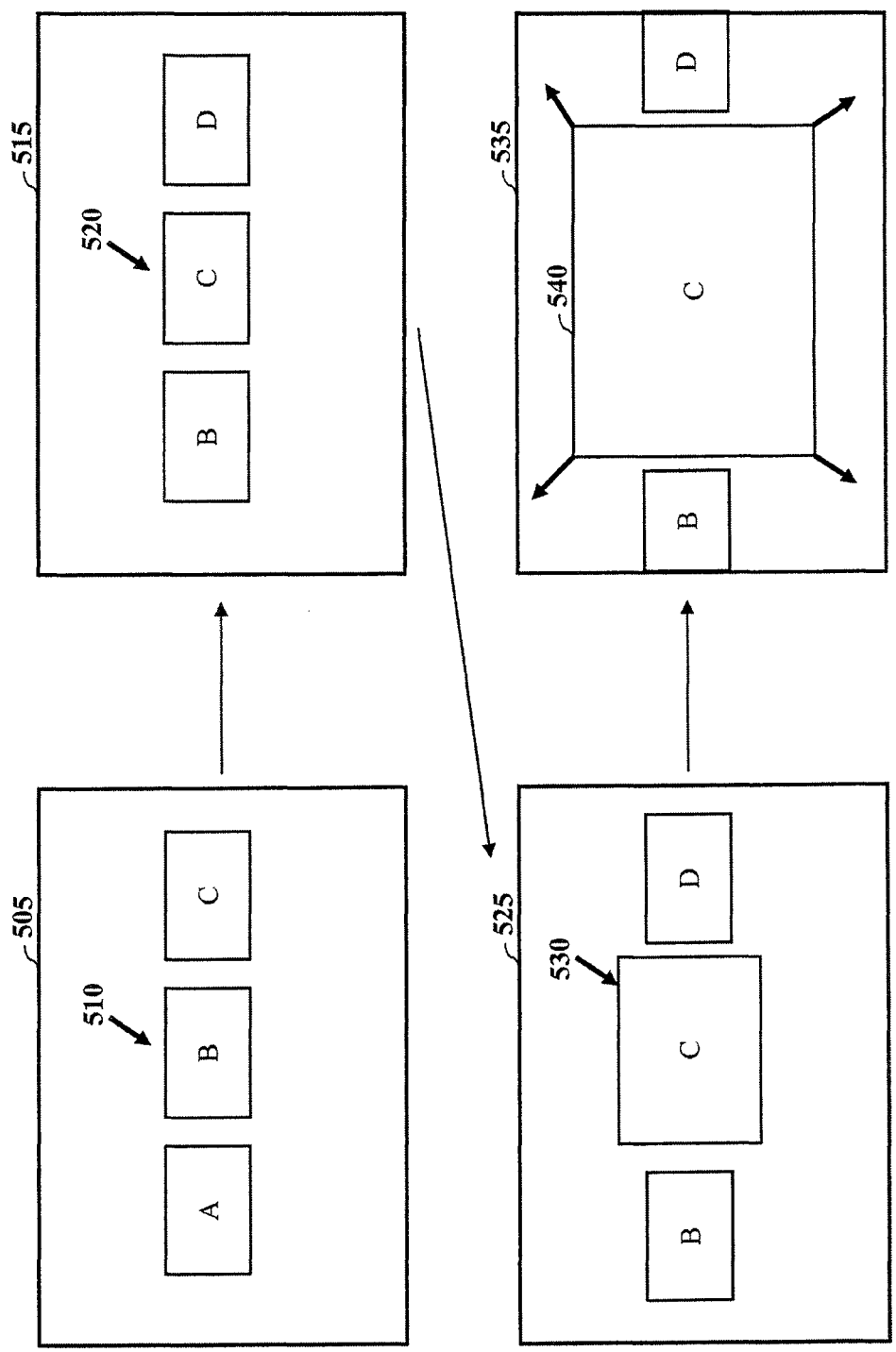
FIG. 5 depicts a graphical representation of user interface operation according to one embodiment.

According to another embodiment, navigation of display configurations may be provided to allow a user to select one or more previously displayed configurations. In that fashion, the user interface may advantageously allow for a user to view previous display points of a history thread, and may advantageously select one or more display configurations without having to manually navigate the user interface through each configuration display. Referring now to FIG. 5, a graphical representation of user interface operation is depicted according to one embodiment. Based on a user command to navigate to one or more previous display configurations, user interface 505 may include one or more graphical elements depicted as 510. In one embodiment, user interface 505 may display the most recent display configurations. Based on a user navigation command, the user interface may allow for scrolling and/or adjusting user interface elements to display different graphical elements, shown by user interface configuration 515. As depicted in user interface configuration 515, scrolling of the user interface window based on a user command may result in display of a set of graphical elements 520. Graphical elements 520 may relate to different display configurations relative to graphical elements 510.

According to another embodiment, when a user does not scroll or adjust the display of graphical elements for a period of time (e.g., 1-4 seconds), the user interface may display adjust the display of graphical elements. As depicted by interface configuration 525, following display of user interface configuration 515, the user interface may display a selected or graphical element that is highlighted by the user with increased size, as depicted by 530. When the user selects the particular graphical element, such as element 530, the user interface may adjust the display configuration as depicted by user interface configuration 535 to display configuration 540 associated with the selected graphical element as the user interface, wherein element 540 is expanded to transition to the display configuration.

Figure 6A:
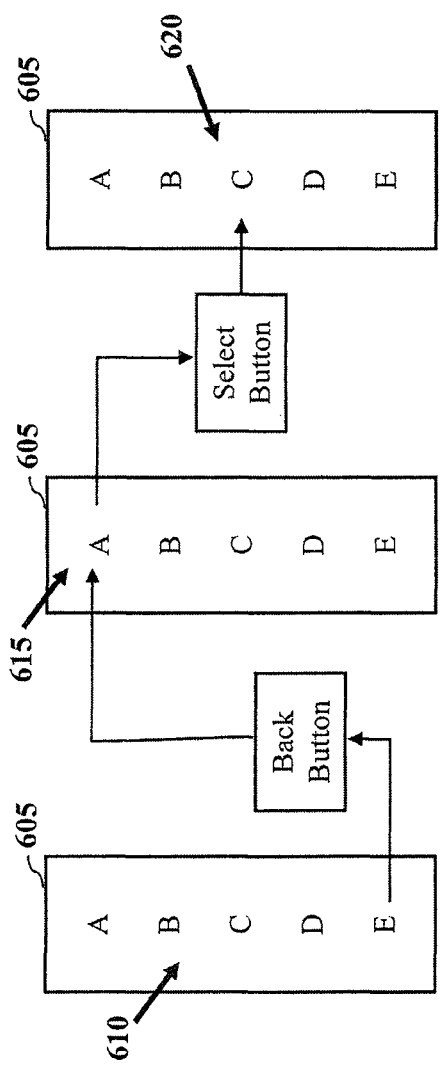
FIGS. 6A-6B depict graphical representations of display configuration threads according to one or more embodiments.
Figure 6B:
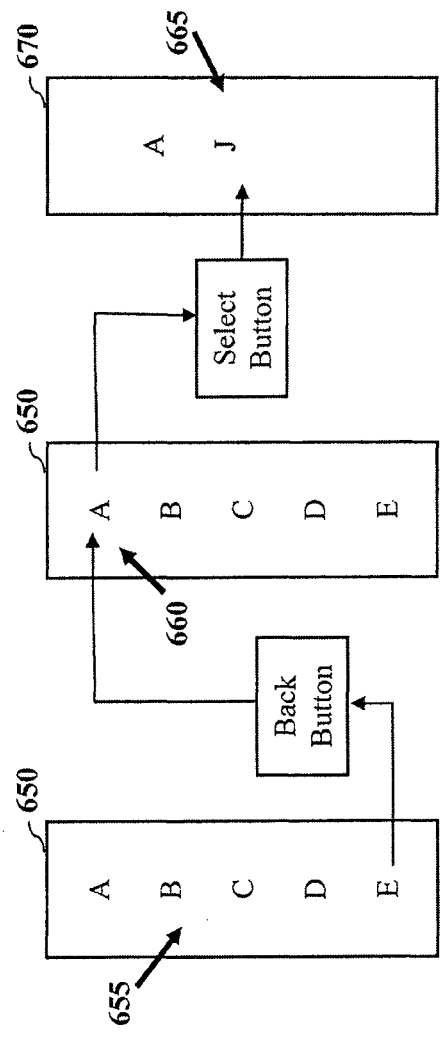

Referring no to FIGS. 6A-6B, graphical representations are depicted of display configuration threads according to one or more embodiments. According to one embodiment, the user interface may store one or more display configurations as a history thread. The history thread may be employed for navigating to one of more display configurations. According to another embodiment, the history thread may be updated based on user operation of the user interface. Referring first to FIG. 6A, history thread 605 includes a plurality of display configurations depicted as 610. Although, history thread 605 includes five elements, it should be appreciated that the history thread may be configured to store additional configurations. For example, in certain embodiments, up to one hundred display configurations may be stored. The user interface may track the position of the user relative to the history thread.

Based on a user operation command, such as activation of a back button, the user interface may adjust a display configuration of the history thread shown as 615. According to another embodiment, the user may navigate to another display configuration as depicted by 620 based on a selection of a graphical element associated with a particular display configuration.

Referring now to FIG. 6B, history thread 650 is depicted according to one embodiment. History thread 650 includes a plurality of display configurations depicted as 655. Based on user navigation commands, the user interface may adjust the display to display configuration 660 of history thread 650. The user interface may then display a new display configuration (e.g., not stored in history thread 650) based on a user selection of the user interface, depicted as 655. For example, user selection of a displayed graphical element associated with a media title may result in the user interface displaying a configuration based on the media title. Accordingly, the user interface may store the display configuration, shown as 665, and modify history thread as 670.

Figure 7:
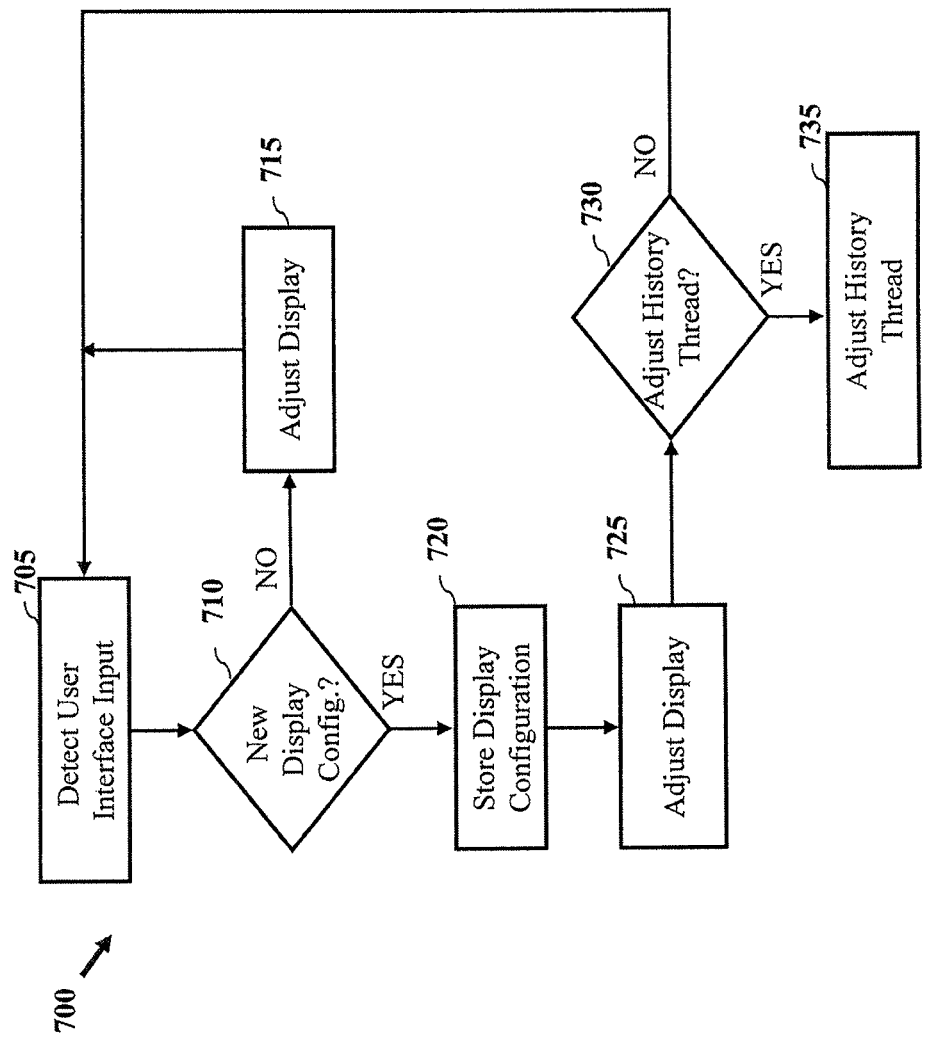
FIG. 7 depicts a process for user interface operation according to another embodiment.

Referring now to FIG. 7, a process is depicted for user interface operation according to another embodiment. Process 700 may be initiated by detecting a user operation of the user interface. Based on user operation, the user interface may adjust the current display configuration. For example, user selection of a media title from a display configuration of a plurality of media titles may initiate a display configuration providing directed data for the selected media title. Alternatively, the user interface may allow for user operation within the display configuration which does not require a change to the display configuration. For example, when the display configuration relates to display of graphical elements in a grid arrangement, the user interface may allow for a user to scroll the display of graphical elements. Scrolling of the graphical elements, however, may not require adjusting the display configuration to another display configuration in one embodiment. At decision block 710, the user interface may check if the user input requires a change to the display configuration. When the user interface does not require an adjustment of the display configuration (e.g., "NO" path out of decision block 710), the user interface may modify the display of the user interface within the display configuration at block 715. When the user interface does require an adjustment of the display configuration (e.g., "YES" path out of decision block 710), the user interface may store the displayed display configuration at block 720. Storage of the display configuration may include storing configuration data required to provide the display by the user interface. For example, when the user interface relates to display of a plurality of graphical elements associated with media titles, the data associated with the display configuration may provide the display configuration types and one or more attributes employed to select particular graphical elements. At block 725, the user interface may adjust the display of the user interface to a different display configuration. Adjusting the display at block 725 may be based on the user selected detected at block 705.

Based on adjustment of the display at block 725, process 700 may continue by determining whether to adjust the history thread at decision block 730. When the user interface does not require an adjustment of the history thread (e.g., "NO" path out of decision block 730), the user interface may detect user input at block 705. When the user interface does require an adjustment of the history thread 735 (e.g., "YES" path out of decision block 730), the user interface may adjust the history thread to account for user operation of the user interface.

While this document has been particularly shown and described with references to exemplary embodiments thereof, it will be understood by those skilled in the art that various changes in form and details may be made therein without departing from the scope encompassed by the appended claims.

What is claimed is:

1. A method for user interface operation, the method comprising the acts of:
   displaying a plurality of configurations of a user interface individually on a device based on user interactions with the user interface, wherein each user interface configuration is associated with a display configuration representing the user interface configuration and including one or more graphical elements;
   storing the display configurations and maintaining a chronological relationship between the display configurations based on the order in which the associated user interface configurations were displayed; and
   simultaneously displaying a plurality of the display configurations upon detecting a user command associated with navigating to one or more previously displayed user interface display configurations.

2. The method of claim 1, wherein the display configurations of the user interface each relate to one or more of a grid arrangement of graphical elements, a detailed view of a graphical element, and an animation of graphical elements.

3. The method of claim 1, wherein the user command relates to user activation of a button for control of the device.

4. The method of claim 1, wherein the user command relates to selection of a menu displayed by the user interface.

5. The method of claim 1, wherein storing the display configurations comprises storing one or more attributes of each of the user interface configurations prior to transition to another user interface configuration.

6. The method of claim 1, wherein the simultaneous display of the plurality of display configurations comprises a chronologically ordered scrollable list of the plurality of display configurations.

7. The method of claim 1, further comprising detecting one or more user commands for navigating the simultaneously displayed plurality of display configurations, and adjusting the display of the plurality of display configurations based on the detected user commands.

8. The method of claim 1, further comprising redisplaying one of the user interface configurations upon selection of the display configuration associated with the one of the user interface configurations from the simultaneously displayed plurality of display configurations.

9. The method of claim 1, further comprising adjusting the chronological relationship between the display configurations based on user navigation of the user interface such that if the user navigation from one of the user interface configurations associated with a previously stored display configuration to another of the user interface configurations conflicts with the stored chronological relationship between the display configurations, the conflicting portion of the stored chronological relationship is removed and replaced with the new chronological relationship between the previously stored display configuration and a display configuration associated with the another of the user interface configurations.

10. A computer program product stored on a non-transitory computer readable medium including computer executable code which when executed by a processor causes the processor to perform the method comprising:
   displaying a plurality of configurations of a user interface individually on a device based on user interactions with the user interface, wherein each user interface configuration is associated with a display configuration representing the user interface configuration and including one or more graphical elements;

storing the display configurations and maintaining a chronological relationship between the display configurations based on the order in which the associated user interface configurations were displayed; and simultaneously displaying a plurality of the display configurations upon detecting a user command associated with navigating to one or more previously displayed user interface display configurations.

11. The computer program product of claim 10, wherein the display configurations of the user interface each relate to one or more of a grid arrangement of graphical elements, a detailed view of a graphical element, and an animation of graphical elements.

12. The computer program product of claim 10, wherein the user command relates to user activation of a button for control of the device.

13. The computer program product of claim 10, wherein the user command relates to selection of a menu displayed by the user interface.

14. The computer program product of claim 10, wherein storing the display configurations comprises storing one or more attributes of each of the user interface configurations prior to transition to another user interface configuration.

15. The computer program product of claim 10, wherein the simultaneous display of the plurality of display configurations comprises a chronologically ordered scrollable list of the plurality of display configurations.

16. The computer program product of claim 10, wherein the method further comprises detecting one or more user commands for navigating the simultaneously displayed plurality of display configurations, and adjusting the display of the plurality of display configurations based on the detected user commands.

17. The computer program product of claim 10, wherein the method further comprises redisplaying one of the user interface configurations upon selection of the display configuration associated with the one of the user interface configurations from the simultaneously displayed plurality of display configurations.

18. The computer program product of claim 10, wherein the method further comprises adjusting the chronological relationship between the display configurations based on user navigation of the user interface such that if the user navigation from one of the user interface configurations associated with a previously stored display configuration to another of the user interface configurations conflicts with the stored chronological relationship between the display configurations, the conflicting portion of the stored chronological relationship is removed and replaced with the new chronological relationship between the previously stored display configuration and a display configuration associated with the another of the user interface configurations.

19. A device, comprising:

a display;

a memory; and a processor coupled to the display, and the memory;

wherein the memory includes computer executable code which when executed by the processor causes the device to perform the method comprising:

displaying a plurality of configurations of a user interface individually on a device based on user interactions with the user interface, wherein each user interface configuration is associated with a display configuration representing the user interface configuration and including one or more graphical elements;

storing the display configurations and maintaining a chronological relationship between the display configurations based on the order in which the associated user interface configurations were displayed; and simultaneously displaying a plurality of the display configurations upon detecting a user command associated with navigating to one or more previously displayed user interface display configurations.

* * * * *